Oct. 12, 1965     B. E. BALKIN     3,210,846
DENTAL TABLE
Filed Jan. 26, 1962     2 Sheets-Sheet 1
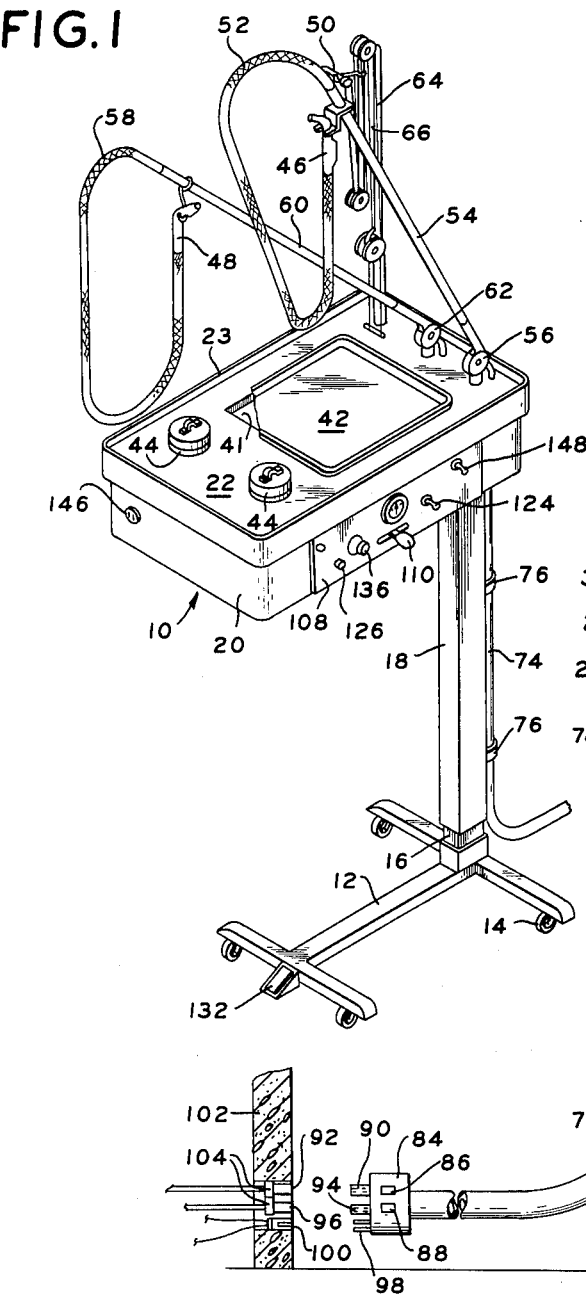
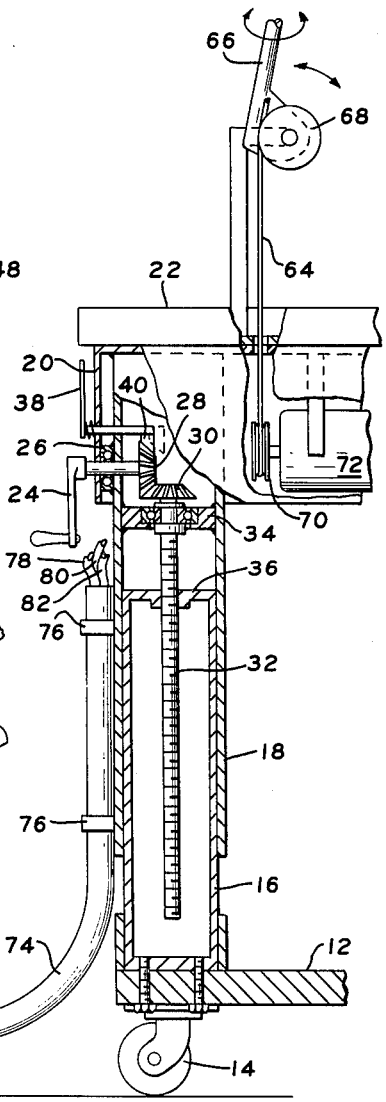
INVENTOR.
BURTON E. BALKIN
BY Arthur H. Seidel
ATTORNEY

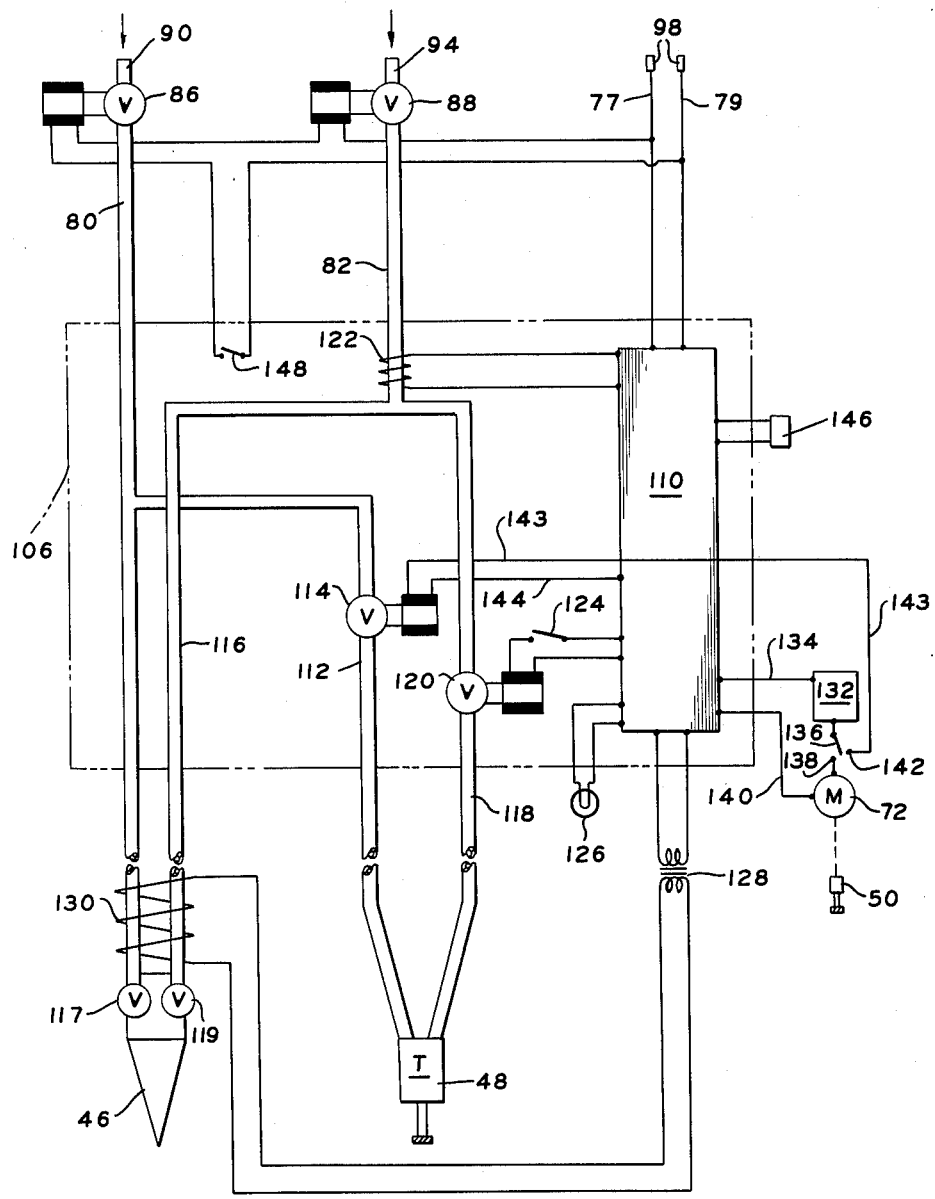

United States Patent Office 3,210,846
Patented Oct. 12, 1965

3,210,846
DENTAL TABLE
Burton E. Balkin, Philadelphia, Pa.
(304 Old Lancaster Road, Merion, Pa.)
Filed Jan. 26, 1962, Ser. No. 168,884
4 Claims. (Cl. 32—22)

This invention relates to a dental apparatus, and more particularly, to a novel dental apparatus having numerous advantages over the apparatus proposed heretofore.

The dental apparatus of the present iinvention provides complete mobility so that the apparatus may be moved wherever desired within a room or from room to room. This feature is to be contrasted with the dental apparatus proposed heretofore which is fixedly secured in one spot to a floor of a buildiing or the like. Due to the mobility of the dental apparatus and the mounting for the drills and/or syringe, a patient need not see the drill until just before the drill is inserted into the patient's mouth. This feature of the present invention overcomes a psychological factor associated with the apparatus proposed heretofore. Heretofore, the apparatus was positioned in a location so that the patient could constantly view the same.

The dental apparatus of the present invention includes drills and a syringe mounted for simultaneous vertical reciprocation. This feature enables the dentist to be comfortably seated while working on the teeth of a patient. Hence, the dental apparatus of the present invention is more convenient than that proposed heretofore which required the dentist to sit at a point remote from the dental unit or to remain standing while working on a patient's teeth. Also, the vertical adjustment of the support for the drills and syringe enables the dental apparatus to be positioned closer to the patient for greater convenience for the dentist. In this regard, the support for the drills and syringe are mounted on a reciprocally disposed column extending upright from one end of a mobile base.

It is an object of the present invention to provide a novel dental apparatus capable of performing all functions associated with the apparatus proposed heretofore.

It is another object of the present invention to provide a novel dental unit which offers mobility for ease and convenience of use while accommodating to various dental techniques.

It is another object of the present invention to provide a mobile dental unit so that the apparatus may be disposed in back of a patient sitting in a dental chair.

It is another object of the present invention to provide a novel dental unit which enables the dentist to be comfortably seated while working on a patient's teeth with elements of the unit within easy reach of the dentist.

It is still another object of the present invention to provide a novel dental apparatus capable of being rapidly and easily moved from one room to another.

Other objects will appear hereinafter.

For the purpose of illustrating the invention there is shown in the drawings a form which is presently preferred: it being understood, however, that this invention is not limited to the precise arrangements and instrumentalities shown.

FIGURE 1 is a perspective view of the apparatus of the present invention illustrating the right side and one end.

FIGURE 2 is a partial left side elevation view of the apparatus illustrated in FIGURE 1, with portions being broken away for clarity of illustration.

FIGURE 3 is a schematic diagram illustrating circuitry associated with the various drills and syringe.

Referring to the drawing in detail, wherein like numerals indicate like elements, there is shown in FIGURE 1 a novel dental unit or apparatus of the present invention designated generally as 10.

The dental apparatus 10 includes a mobile H-shaped base 12 mounted on wheels 14. The wheels 14 include a swivel casting which enables the apparatus 10 to be conveniently guided as to direction when moving the same. An upright column 16 is supported by the base 12 at one side edge thereof. A hollow column 18 is telescopically disposed over the column 16. A generally rectangular housing 20 is supported in cantilever fashion from the upper end of the column 18 so that it extends over the base 12. The housing 20 includes a table 22 across its upper surface. The table 22 is provided with a raised ridge 23 around its entire periphery and is slightly longer than base 12.

A selectively operable means is provided to raise and lower the table 22 with respect to the base 12. Such means includes a crank handle 24 which is rotatably supported by a bearing 26. The bearing 26 is fixedly disposed between the column 18 and the housing 20. The crank handle 24 terminates in a bevel gear 28 which is meshingly engaged with a bevel gear 30. The bevel gear 30 is fixedly secured to the upper end of an upright threaded shaft 32. The threaded shaft 32 has its upper end fixedly secured and rotatably disposed within a bearing supported by a wall 34. The wall 34 is fixedly secured within the column 18. The threaded shaft 32 is threadedly secured and extends through a wall 36 at the upper end of the column 16. A major portion of the shaft 32 is disposed within the column 16.

The vertical disposition of the table 22 is determined by the relative position of the shaft 32. By rotating the crank handle 24, the table 22 may be raised or lowered. A selectively operable means is provided to prevent the crank handle 24 from rotating. Such means includes a latch operator 38 spring biased in a direction away from and perpendicular to a side face of the housing 20. The operator 38 has a portion extending through the said face of the housiing 20 and the column 18 wherein it terminates in a latch member 40. The latch member 40 is adapted to be disposed between adjacent teeth on the bevel gear 28. When the operator 38 is pressed inwardly thereby compressing the spring, the latch member 40 may be moved to the phantom position illustrated in FIGURE 2.

As shown more clearly in FIGURE 1, the table 22 is provided with a well within which a tray 42 may be removably disposed. The tray 42 is adapted to support the various drills and other dental paraphernalia. The ridge 23 assists in preventing paraphernalia from rolling off the table 22. The table 22 is also provided with a pair of spaced wells within which containers 44 may be removably disposed. The containers 44 are adapted to contain cotton and/or swabs.

The apparatus 10 includes a triplex syringe 46. The triplex syringe 46 is disposed at one end of a flexible conduit 52. The other end of the conduit 52 is connected to a rigid conduit 54 which is rotatably supported by a rotary coupling 56 providing rotary movement in two mutually perpendicular planes.

The apparatus 10 also includes an air turbine dental drill 48. The drill 48 is disposed at one end of a flexible conduit 58. The other end of the flexible conduit 58 is secured to one end of a rigid conduit 60. The other end of the conduit 60 is supported by a rotary coupling 62 which enables the conduit 60 to rotate in two mutually perpendicular planes.

The apparatus 10 also includes a conventional mechanical dental drill 50 supported at one end of a plurality of pivotably connected rigid rods 56. The drill 50 is driven by an endless belt 64 which extends through a hole in table 22 and around a pulley 70. The pulley 70 is secured to the output shaft of a rotary electric motor 72. The motor 72 is supported within the housing 20 in any convenient manner. A rotary coupling 68 facilitates rotary movement of the rod 66 in two mutually perpendicular planes.

The apparatus 10 also includes an elongated conduit sheath 74. Portions of the sheath 74 are removably secured to the column 18 by means of clips 76. The conduit sheath 74 provides a flexible housing for the electric conduit 78, air conduit 80 and water conduit 82. If desired, conduit sheath 74 could include a gas conduit. The electrical conduit 78 has electrical wires 77 and 79 disposed therein. The end of the flexible conduit sheath 74, which is remote from the apparatus 10, terminates in a multi unit plug 84. The plug 84 includes a normally closed solenoid operated valve 86 for controlling flow of air through the conduit 80 and a normally closed solenoid operated valve 88 for controlling flow of water through conduit 82. The conduit 80 terminates in a male plug member 90. The conduit 82 terminates in a male plug member 94. The wires 77 and 79 terminate in male plug members 98.

The plug 84 is adapted to be received within a receptacle on a wall 102. The receptacle includes a female member 92 for receiving the member 90, a female member 96 for receiving the member 94 and a female socket 100 for receiving the male members 98. The female member 92 is adapted to provide communication between a supply conduit and the male member 90. The female member 96 is adapted to provide communication between a source of water and the male member 94. The female socket 100 is adapted to provide electrical communication between a source of power and the male members 98.

Check valves 104 are disposed within the female members 92 and 96. When the male members 90 and 94 are inserted within the female members 92 and 96, respectively, the check valves 104 are open. When the members 90 and 94 are in the position illustrated in FIGURE 2, the check valves 104 are closed. A receptacle comparable to that illustrated in wall 102 may be provided in numerous rooms within a building or dental office. In this manner, a single dental apparatus 10 may be readily untilized in any one of a plurality of rooms.

As shown more clearly in FIGURE 3, the housing 20 will include a control box 106. The control box 106 is provided with a control panel 108 as shown more clearly in FIGURE 1. The control box 106 includes a main switch 110 which is operable from the control panel 108. The main switch 110 is supplied with electrical current by the wires 77 and 79.

The conduit 80 is connected to the triplex syringe 46 through the conduits 52 and 54. The conduit 80 is provided with a branch conduit 112 which extends to the air turbine drill 48 through the conduits 58 and 60. Flow of air through the conduit 112 is controlled by a selectively operable solenoid operated valve 114.

The water conduit 82 terminates in a pair of branch conduits 116 and 118. Conduit 116 extends to the triplex syringe 46 through the conduits 52 and 54. Flow of air through the syringe 46 is controlled by a manually operable valve 117 on the syringe 46. Control of water through the syringe 46 is controlled by a manually operable valve 119 on the syringe 46. By pressing both valves 117 and 119, a mixture of water and air may be discharged through the syringe 46.

The conduit 118 is connected to the turbine drill 48 through the conduits 58 and 60. Flow of water through conduit 118 is controlled by means of a selectively operable solenoid operated valve 120. The solenoid operated valve 120 is electrically coupled to the main switch 110 through a manually operable switch 124. Switch 124 may be disposed on the panel 108.

An indicator light 126 is disposed on the panel 108. Whenever the main switch 110 is on, the light 126 will be on. The primary coil of a step-down transformer 128 is coupled through the switch 110. The secondary of the transformer 128 is connected to a heater coil 130. The heater coil 130 surrounds the conduits 80 and 106 adjacent the triplex syringe 46. The wires extending between the transformer 128 and the heater coil 130 may extend through the conduits 52 and 54. A heater coil 122 extends around the conduit 82. The heater coil 122 is connected to the main switch 110.

A foot pedal switch 132 may be supported by the base 12 at an end thereof remote from the column 16. As shown more clearly in FIGURE 3, the switch 132 has one terminal connected directly through the main switch 110. The other terminal of the switch 132 is connected to a switch 136. The switch 136 has a movable element adapted to selectively and alternatively make contact with terminals 138 and 142. The terminal 138 is connected to one terminal of the motor 72 for operating the mechanical drill 50. The other terminal of the motor 72 is electrically coupled through the main switch 110 by the wire 140.

The terminal 142 is connected to one side of the solenoid operator for the valve 114 by means of wire 143. The other side of this solenoid operator is connected through the main switch 110 by means of wire 144. A socket 146 is supported by the housing 20 as shown more clearly in FIGURE 1 and electrically coupled through the main switch 110 as shown more clearly in FIGURE 3.

A switch 148 is provided on the panel 108. As shown more clearly in FIGURE 3, the switch 148 is electrically coupled to the solenoid operators for the valves 86 and 88. The valves 86 and 88 are supported by the plug 84 as shown more clearly in FIGURE 2. As shown more clearly in FIGURE 3, the solenoid operators for the valves 86 and 88 are in series with one another and coupled to the switch 148 by means of taps off the wires 77 and 79. Hence, it will be seen that the air and/or water within the conduits 80 and 82 may not be discharged out through the male members 90 and 94, respectively, while the apparatus 10 is being moved from one room to another. In this regard, the closing of the valves 86 and 88 prior to movement of the apparatus 10 is controlled either by opening switch 148 or by separating the plug 84 from the receptacle. When plug 84 is separated from the receptacle, it is immaterial whether switch 148 is open or closed.

The operation of the apparatus 10 and the manner of use is as follows:

A patient will be disposed on a conventional dental chair in a usual manner. The apparatus 10 facilitates positioning of the dental chair in a substantially horizontal disposition. The apparatus 10 may be pushed to a disposition behind the dental chair so that the patient need not see the various drills and syringe. The plug 84 will be coupled to the receptacle in the wall 102. The switches 110 and 148 will be placed in an on position. The indicator light 126 will be lit. Water flowing through conduit 82 and in conduit 116 adjacent the syringe 46 will be in a warm condition. Likewise, air within the conduit 80 adjacent the syringe 46 will be warm.

The elevation of the housing 20 and table 22 will be adjusted by the dentist so that he may be disposed in a sitting position alongside the dental chair. Such adjustment may be attained by pushing inwardly on the operator 38 and rotating the crank handle 24. In a working embodiment of the present invention, approximately twenty-four inches of vertical adjustment is provided. If the dentist desires to utilize the mechanical drill 50, the movable element of the switch 110 will be manipulated to a position making contact with terminal 138. Thereafter, the dentist need only step on the foot pedal 132 to cause operation of the drill 50. Replacement drills and other paraphernalia will be disposed on the tray 42.

If the dentist wishes to utilize the air turbine drill 48, the movable element of the switch 110 will be manipulated to make contact with terminal 142. Operation of the turbine drill 48 is attained by stepping on the foot pedal switch 132 which opens the valve 114. If it is desired to have a water spray in conjunction with the air drill 48, switch 124 may be manipulated to an on position thereby causing valve 120 to open. Whenever it is desired to dry a tooth or rinse the same, the triplex syringe is readily available for this purpose. The mounting for the syringe 46, air turbine drill 48 and drill 50 enables these elements to be readily rotated and moved to a comfortable position. The flexible conduits for these elements enables the apparatus 10 to be disposed behind the patient with the flexible conduit extending over the patient's shoulder. Thus, the patient need not see the dental drills and syringe. This has a definite psychological advantage in reducing fear in the patient.

Rigid conduits 54 and 60 provide a means for supporting the syringe 46 and drill 48, respectively, in a position so that they are in easy reach of a dentist. The rotary mounting for conduits 54 and 60 facilitates uninhibited movement of the syringe 46 and drill 48. Also, the rigid conduits support the syringe 46 and drill 60, respectively, in a position so that the flexible conduits 52 and 58 do not drag over or lie on the patient's arms or shoulders.

The foot pedal switch 132 may be supported on the floor or on the base 12. In my preferred embodiment, the switch 132 is disposed in a housing having a magnet on a rear wall. The magnet will retain the foot pedal on the base 12 in a convenient location as desired by the comfort of the dentist. In this manner, the dentist may cause the switch housing to move along the base 12 by pushing the same with his foot and the switch housing will move with the base 12 as the base 12 is moved about. The wires connected to the switch 132 are preferably of greater length than required and disposed in a flexible sheath so that the switch housing may be moved to a disposition on the floor which is located beyond the magnetic field of the magnet. This feature provides the apparatus 10 with greater versatility.

Apparatus which enables the patient to expectorate may be removably secured to an arm of the dental chair. Such apparatus forms no part of the present invention and need not be described in detail.

Thus it will be seen that I have provided a novel dental apparatus which offers a greater degree of flexibility and mobility while at the same time is more convenient for the dentist since it enables the dentist to be disposed in a comfortably seated position while working on the teeth of a patient. The drills 48 and 50 and the syringe form a dental unit supported on a table which provides article support space below which the dentist's feet may be disposed.

The present invention may be embodied in other specific forms without departing from the spirit or essential attributes thereof and, accordingly, reference should be made to the appended claims, rather than to the foregoing specification as indicating the scope of the invention.

I claim:

1. A dental apparatus comprising a base, a table supported above said base by telescoping columns, a dental drill supported from said table by conduit means, a flexible conduit sheath extending from said table, water and air conduits disposed within said conduit sheath, a syringe supported by said table, means coupling said drill to said air conduit, said flexible conduit sheath having an end remote from said table, a plug at said end of said conduit sheath, said air and water conduits terminating in plug in members at said plug, solenoid operated valves supported by said plug, one solenoid operated valve selectively controlling flow through said water conduit, the other solenoid operated valve selectively controlling flow through said air conduit, and switch means operatively coupled to said solenoid operated valves for controlling the same, and said switch means being supported below said table.

2. Apparatus comprising a table structure, an air turbine dental drill supported by said table structure, a syringe adapted to selectively dispense water or air, said syringe being supported by said table structure, an air conduit coupled to said syringe and air turbine drill, a water conduit coupled to said syringe, said air and water conduits being disposed within a conduit sheath, said conduit sheath terminating in a plug, a male member communicating with said air conduit, said male member extending from said plug, a second male member communicating with said water conduit, said second male member extending from said plug, said first and second male members being adapted to cooperate with female members in a wall mounted receptacle and valve means in said plug for selectively controlling flow through said air and water conduits.

3. A dental apparatus comprising a base, a table supported above said base by telescoping columns, a dental drill supported from said table by conduit means, a flexible conduit sheath extending from said table and having an end remote from said table, water and air conduits disposed within said conduit sheath, a plug at said end of said conduit sheath, said air and water conduits terminating at plug-in members at said plug, a syringe supported by said table, means coupling said syringe to said water conduit, means coupling said drill to said air conduit, and a valve means in said plug for selectively controlling flow through said air and water conduits.

4. A dental apparatus comprising a base, a table supported above said base by telescoping columns, said columns including a first column disposed adjacent a side edge of said table and a second column disposed adjacent a side edge of said base, a dental drill supported from said table by conduit means, a flexible conduit sheath extending from said table and having an end remote from said table, water and air conduits disposed within said conduit sheath, a plug at said end of said conduit sheath, said air and water conduits terminating at plug-in members at said plug, a syringe supported by said table, means coupling said syringe to said water conduit, means coupling said drill to said air conduit, and a valve means in said plug for selectively controlling flow through said air and water conduits.

References Cited by the Examiner

UNITED STATES PATENTS

| 451,246 | 4/91 | Justi | 32—22 |
| 533,445 | 2/95 | Denison | 32—22 |
| 944,560 | 12/09 | Joseph | 108—147 |
| 2,419,370 | 4/47 | Roof | 32—22 |
| 2,420,338 | 5/47 | Page | 32—28 |
| 2,551,458 | 5/51 | Page | 32—28 |
| 3,094,780 | 6/63 | Maurer et al. | 32—28 |

FOREIGN PATENTS

| 1,052,103 | 9/53 | France. |
| 551,456 | 6/32 | Germany. |
| 1,106,921 | 5/61 | Germany. |
| 1,115,408 | 10/61 | Germany. |

OTHER REFERENCES

Stephens: Air Turbine Handpiece Motors, Brit. Dental Journal, June 19, 1956, pp. 1–6, pp. 3–4 relied on.

RICHARD A. GAUDET, *Primary Examiner.*

JORDAN FRANKLIN, *Examiner.*